United States Patent [19]
Öberg

[11] 3,980,350
[45] Sept. 14, 1976

[54] METHOD AND DEVICE FOR REGULATING THE BRAKING CYCLE FOR AN INDIVIDUAL WHEEL ON A VEHICLE

[75] Inventor: Ulf Erik Öberg, Goteborg, Sweden

[73] Assignee: Saab-Scania Aktiebolag, Sodertalje, Sweden

[22] Filed: Feb. 28, 1975

[21] Appl. No.: 554,219

[30] Foreign Application Priority Data
Mar. 1, 1974 Sweden .............................. 7402760

[52] U.S. Cl. .................................. 303/21 A; 303/20
[51] Int. Cl.² .............................................. B60T 8/08
[58] Field of Search ............ 188/181 A; 303/20, 21; 307/10 R; 317/5; 324/162; 340/53, 62, 262

[56] References Cited
UNITED STATES PATENTS

| | | | |
|---|---|---|---|
| 3,674,318 | 7/1972 | Hickner et al. .................. | 303/21 A |
| 3,790,227 | 2/1974 | Dozier ............................ | 303/21 BE |
| 3,832,013 | 8/1974 | Davis et al. ..................... | 303/21 P |
| 3,833,270 | 9/1974 | Gotz et al. ...................... | 303/21 BE |
| 3,861,758 | 1/1975 | Oglesbee et al. ................ | 303/21 P |

Primary Examiner—Stephen G. Kunin
Attorney, Agent, or Firm—Ostrolenk, Faber, Gerb & Soffen

[57] ABSTRACT

A method and a device for regulating a vehicle wheel braking cycle. The braking pressure is caused to vary in response to control parameters, causing the wheel to decelerate and accelerate in an alternating fashion. During acceleration the value of acceleration is measured, and a signal representing the maximum acceleration is compared with a braking pressure signal for the purpose of determining the amount of pressure increase needed over the braking pressure used during the acceleration. The braking pressure is then increased to the value determined by the maximum wheel acceleration.

26 Claims, 6 Drawing Figures

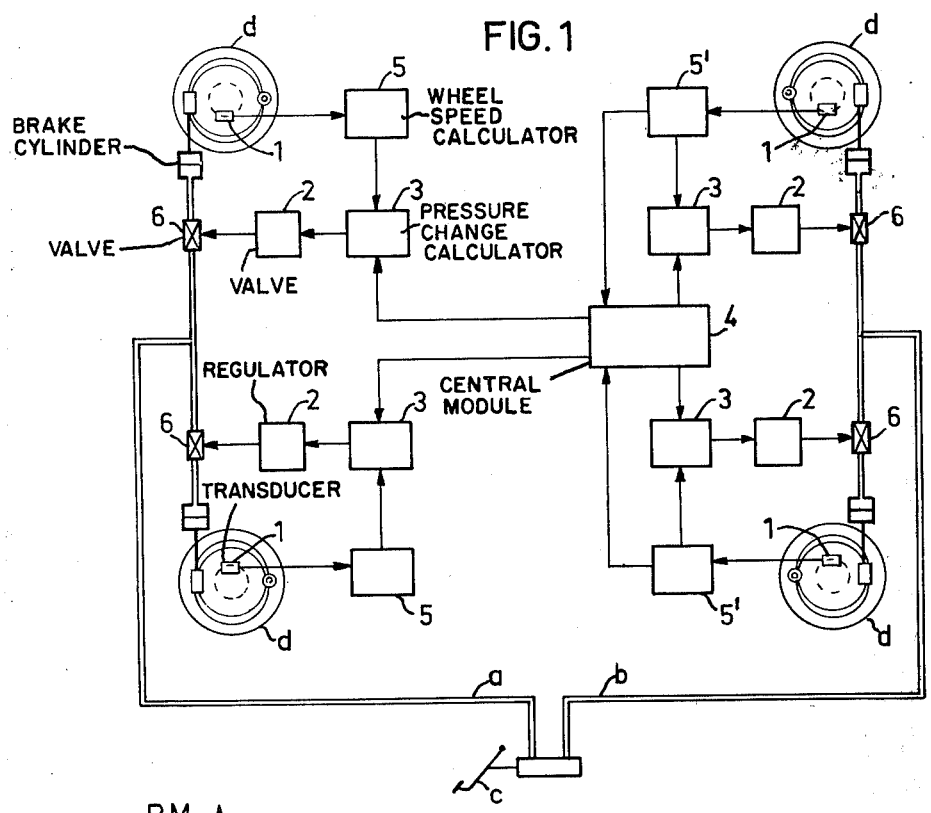
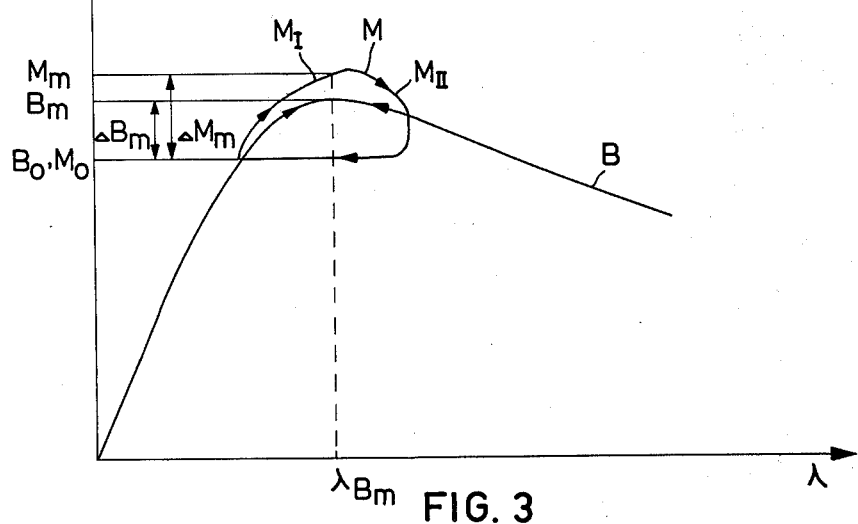

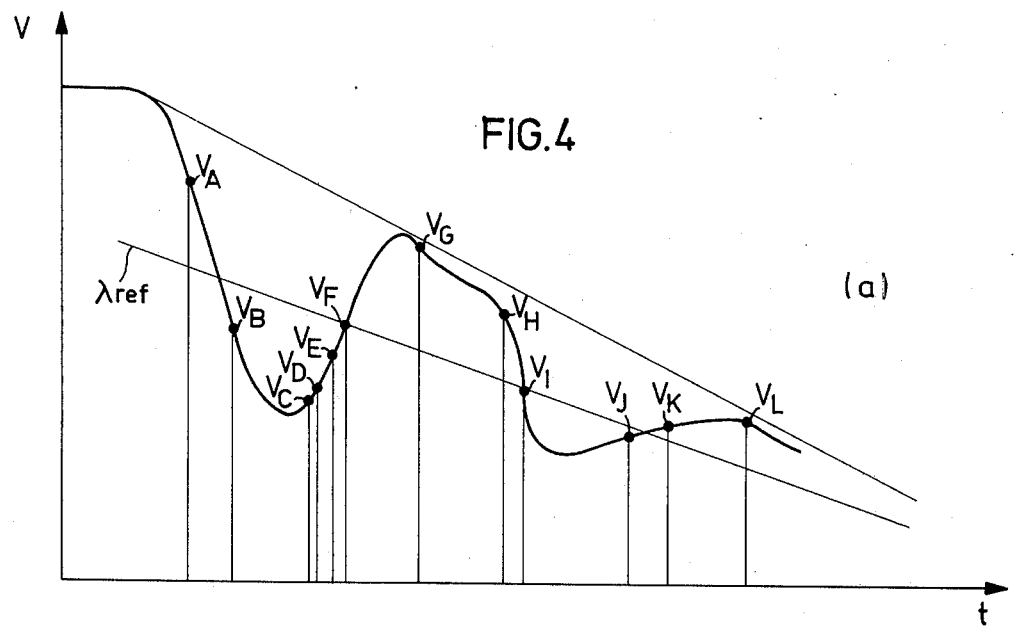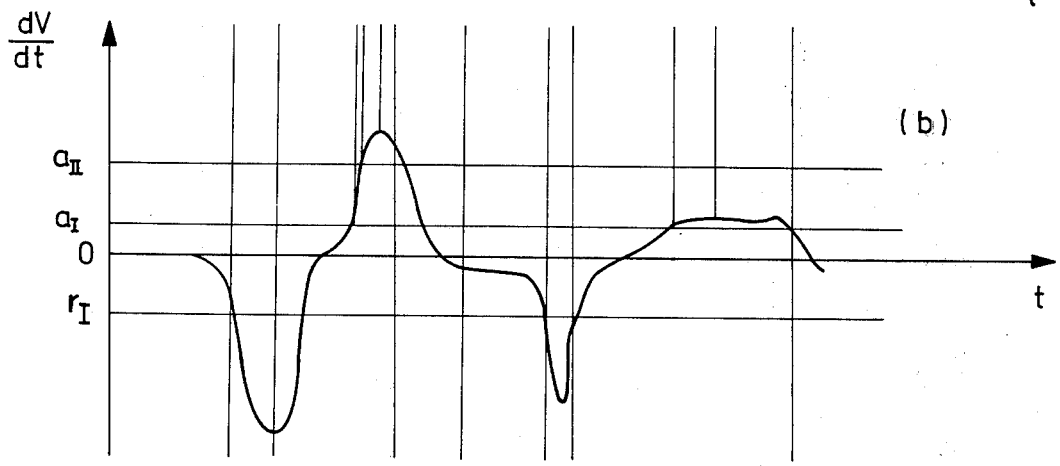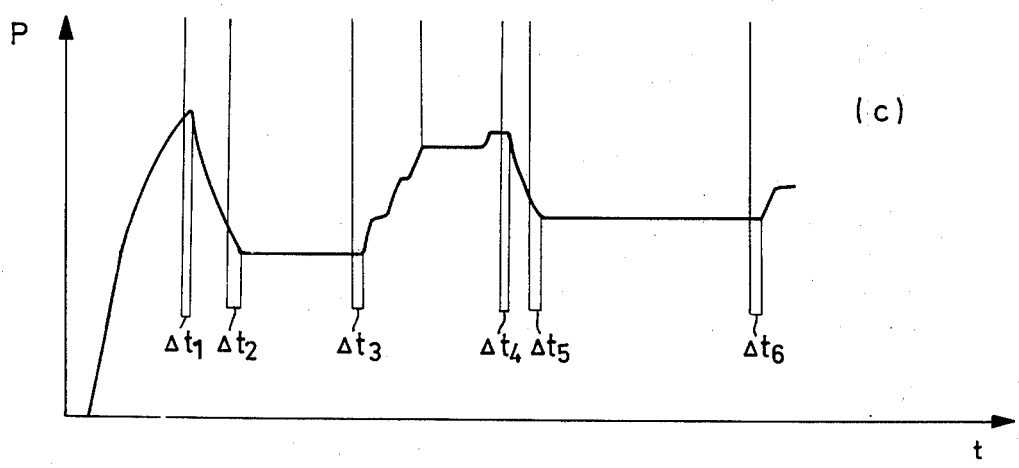
FIG.4

METHOD AND DEVICE FOR REGULATING THE BRAKING CYCLE FOR AN INDIVIDUAL WHEEL ON A VEHICLE

BACKGROUND OF THE INVENTION

The present invention relates to a method and device for regulating a braking operation for an individual wheel on a vehicle equipped with a braking control system. The system comprises measuring means for monitoring wheel speed, an electronic unit, and a valve unit situated in the brake line for coupling the brake pressure medium to an individual wheel. In the method according to the invention, the braking pressure to the wheel is caused to vary in response to reference values for different control parameters, so that during the course of braking the wheel is affected during a number of braking control cycles, during which the wheel, by means of pressure alterations in the braking pressure medium, is retarded from a first rotational speed to a second lower rotational speed and is thereafter allowed to increase its rotational speed at a reduced braking pressure, so that at least one reference parameter sets off the next controlling cycle, the maximum braking capacity of the wheel on the appropriate road surface being reached and exceeded during the reduction of the wheel rotational speed from the first to the second value.

In braking, it is a well known problem that when the braking moment on a wheel becomes larger than the road moment which is the product of wheel radius and frictional force between wheel and road, the wheel will skid. The result of this may be that the braking capacity of the wheel is decreased simultaneously as steering capacity is wholly or partly lost.

The braking force which is obtained in the contact between wheel and substructure during braking is dependent on many factors, such as the nature of the substructure and the wheel, the speed of the vehicle, wheel loading, prevailing temperature etc. For each combination of such conditions the frictional conditions can be described by a characteristic graph in a coordinate system which defines braking force on the wheel as a function of the wheel slip. "Slip" in this case means the difference between the speed of the vehicle and the wheel in relation to the speed of the vehicle. By "wheel speed" is meant here, and in what follows, the rotational speed of the wheel. Characteristic for such a braking force graph is that braking force is present only when slip deviates from zero. With increasing slip, the braking force increases to a maximum, whereafter it diminishes once again. Graphs may also be plotted in the same coordinate system to show how the ability of a wheel to take up side forces varies with the slip. The ability to take up side forces is greatest when no slip prevails, and diminishes first slowly and then more and more rapidly with increasing slip. It is a generally accepted fact that the ability to take up side forces when the lag corresponding to the maximum on the braking force graph still has an acceptable value. To obtain optimal braking capacity it is therefore important to control the braking function at and in the vicinity of the maximum on the braking force graph. With braking pressure control it is also important to keep the braking pressure variations required for the braking function within acceptable limits in the respective braking circuits. This applies especially to pneumatic braking systems, since air consumption would otherwise be too great.

BRIEF DESCRIPTION AND OBJECT OF THE INVENTION

The primary object of the invention is to enable effective braking by utilizing the available frictional force between wheel and road better than before.

The method according to the invention is distinguished in that the acceleration of the wheel is measured and that a signal representing the maximum wheel acceleration is compared with a signal representing actual braking pressure increase for the purpose of determining the amount of braking pressure increase required over the braking pressure used during the acceleration in order to obtain optimum braking capacity between the vehicle wheel and the road surface, and that during the subsequent braking pressure increase a pressure regulating circuit controls increase of the braking pressure to the value determined by the maximum wheel acceleration. In this way information is obtained in advance of the next braking control cycle as to how great the pressure increase which will then be required and may be permitted for obtaining the best possible braking capacity.

In the braking control system for carrying out this method the electronic unit is arranged to control, in response to signals from the measuring means monitoring the wheel speed, the valve unit for alternately raising, lowering and maintaining the pressure at a constant level in the braking circuit of the wheel, whereat the wheel is caused alternately to retarded or accelerated so that the maximum braking capacity of the wheel on the appropriate road surface is obtained, and the system is distinguished in that a module incorporated in the electronic unit and intended for calculating the pressure alteration comprises a pressure comparator which is arranged to compare a signal which is peak value followed in a peak value follower circuit and represents the acceleration of the wheel during a controlling cycle, with a signal corresponding to the current pressure increase.

BRIEF DESCRIPTION OF THE FIGURES

The invention will now be described more closely in the form of an example while referring to the accompanying drawings where FIG. 1 shows a block diagram of a control system installed in a vehicle, FIG. 3 shows a graph of braking moment and road moment as a function of wheel slip and FIG. 4 illustrates graphs (a)–(c) over wheel speed, wheel speed alterations and braking pressure variations for an individual wheel as a function of time during the course of braking.

DETAILED DESCRIPTION OF THE INVENTION

Figure 2:
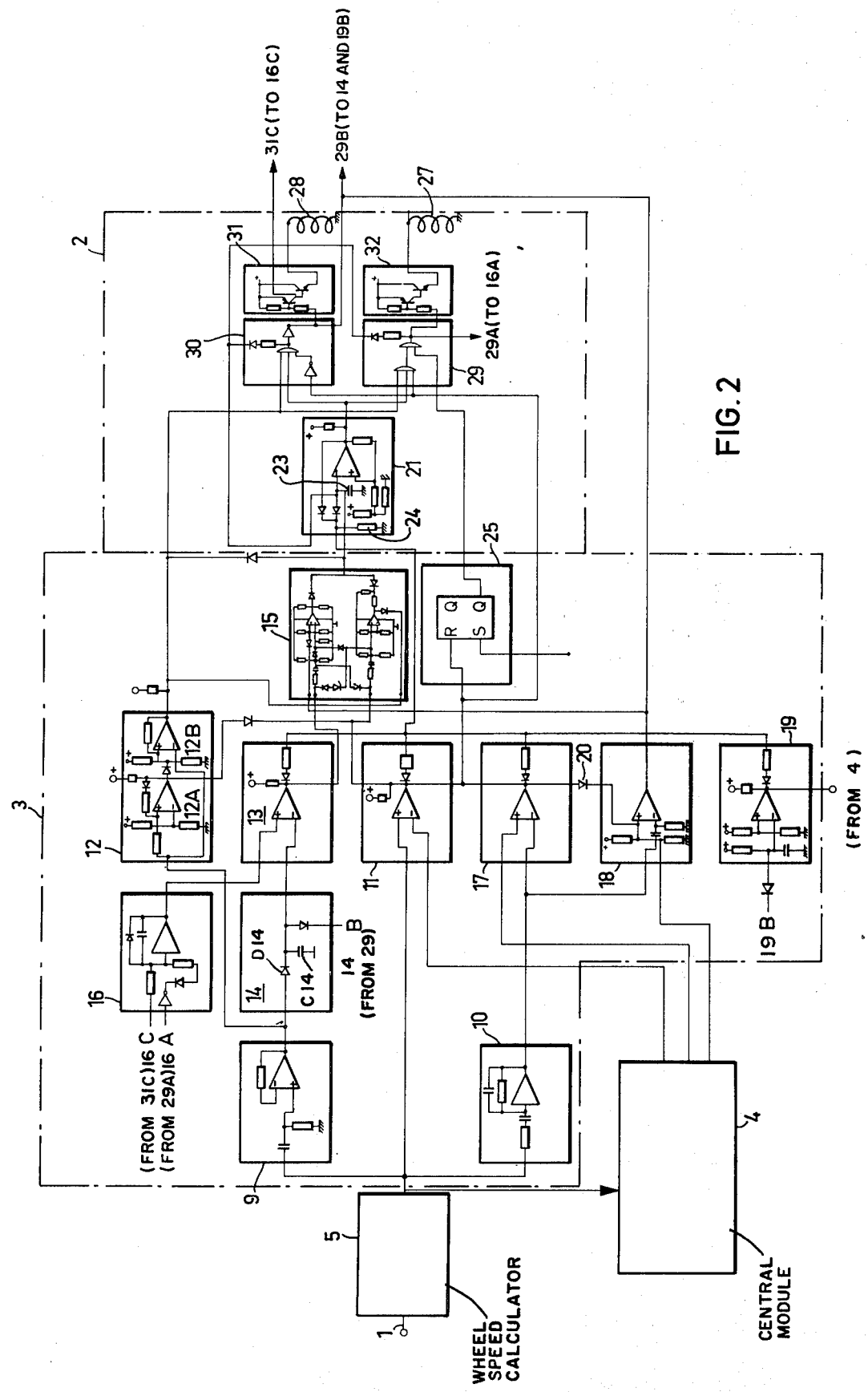
FIG. 2 shows in more detail the modules constituting the braking control system electronic unit.

The braking control system shown as an example (see FIG. 1) is intended for a vehicle equipped with a pneumatic braking system with two braking circuits $a$ and $b$, in which braking pressure is initiated by the vehicle driver operating a brake pedal $c$. The braking control system has the task of providing individual control for braking the respective wheels $d$ in response to predetermined limiting values for slip and acceleration for the wheel during a braking operation. To achieve this, the braking control system comprises a number of separate means for each individual wheel $d$ and a central module 4 common to the different wheels. The separate means for respective wheels $d$ are mutually alike, for which reason the following description is limited to the construction and function of the braking control system for one wheel $d$.

A valve unit 6 is mounted in a brake line to an individual wheel $d$, and includes a valve for regulating braking medium flow to and from the braking means of the wheel $d$, under the influence of signals from an electronic unit comprising the common central module 4 and a number of separate modules for each separate wheel $d$. The separate modules consist of a module 5 for wheel speed calculation, a module 3 for calculating the pressure increase and reduction in the brake line for the wheel $d$ in question, and a valve regulating module 2.

For the inventive braking pressure control, it is necessary to obtain information on both the speed of the vehicle and of each individual wheel $d$ during a braking operation. For measuring the wheel speed of each wheel there is provided a transducer 1 which generates an alternating voltage having a frequency proportional to the wheel speed, this voltage then being applied to the calculating module 5 associated with each wheel and containing a pulse shaper and a frequency doubler connected in series to each other, a constant pulse generator and a filter. The signal from the wheel speed transducer 1 is first converted in the pulse shaper incorporated in module 5 to square wave form, after which the frequency doubler senses each pulse flank or edge of the square wave and feeds out a series of short pulses, the frequency of which is converted in the pulse generator to a more suitable control variable, which in the present case means that the constant pulse generator supplies pulses with constant length and amplitude, i.e. constant voltage-time surface area, the integrated average value of which is proportional to the wheel speed. This average value is obtained in the subsequent filter which is of the low-pass type and contains two RC-branches and an amplifier, and a DC voltage signal corresponding to this value can be taken off from the filter output. This signal is designated wheel speed signal in the following description, and is applied to the calculating module 3.

Wheel speed signals from modules 5' associated with the front wheels of the vehicle are also applied to the central module 4 for calculating the vehicle speed, this module being arranged to feed reference signals to the calculating modules 3 for the respective wheels $d$. The circuits or stages in modules 2,3,5 and module 4 each comprise known basic elements with functions generally known in electronic technology, and therefore the following description is limited to only more closely defining the manner of connection and the coaction of the different circuits or stages in the apparatus according to the invention.

The wheel speed signal output from module 5 (FIG. 2) is fed within each module 3 to a wheel acceleration calculating stage 9 (FIG. 2), a wheel retardation calculating stage 10 and to a stage 11 for detecting wheel lag. Stages 9 and 10 are designed as differentiators, by differentiator being meant a filter circuit with differentiating action built up from known components around an operational amplifier. In these stages 9 and 10, with mutually somewhat different construction, the time derivative of the fed-in wheel speed signal is obtained so that the output signals from stages 9 and 10 will represent wheel acceleration and retardation, respectively, during wheel speed alterations. In the following description these output signals are designated acceleration and retardation signals.

The retardation signal is intended to be applied to a first retardation comparator 17 which compares this signal with a predetermined reference signal taken from the central module 4 and corresponding to the maximum permitted wheel retardation. When the greatest permitted wheel retardation is exceeded, the comparator 17 gives a signal which, via the valve regulating module 2, causes pressure reduction in the brake line by regulating the valve unit 6 connected to it, which contains an inlet valve 27 and an outlet valve 28, each of which is indicated in FIG. 2 by its respective magnet winding. The retardation signal from stage 10 is also supplied to a second retardation comparator 18 which senses heavily increased retardation. The comparators 17 and 18 are connected with each other across a diode 20, blocking the comparator 18 from causing continuous pressure reduction when a signal from comparator 17 is not present. Otherwise, the pressure reduction takes place step-wise under the influence of an output signal from comparator 17, a pulse generator 21 (to be described later) incorporated in module 2 generating constant pulses with a constant frequency during each control cycle for regulating the outlet valve 28.

The detector stage 11 for detecting wheel lag comprises a comparator which compares an instantaneous wheel speed signal from module 5 with a predetermined reference signal from the common central module 4. This reference signal is a signal voltage reduced by a resistance and representing the vehicle speed, varying in response to it so that the reference slip increases with low vehicle speed. The output of detector stage 11 is connected to an output on the first retardation comparator 17 so that pressure reduction cycles caused by stage 11 are analogous to those applied to comparator 17.

The acceleration signal from stage 9 is intended to cause a pressure increase in the relevant brake line for predetermined acceleration limit values, and for this purpose the signal is fed into an acceleration detector 12 and to a pressure comparator 13 by way of a peak value follower circuit 14. The detector 12 comprises two series connected comparators 12A and 12B, in which the instantaneous acceleration signal is compared with reference signals corresponding to predetermined acceleration values triggering pressure increase. A blocking diode is connected between the two comparators and reference signals are fed in from voltage dividers for each of the comparators. The reference signal for comparator 12B corresponds to a lower limit value for the wheel acceleration during a pulse braking operation, while the reference signal for comparator 12A corresponds to an acceleration which is normally attained during a braking operation. When a wheel accelerates, the lower predetermined acceleration limit is arrived at first, whereat detector 12 emits a signal closing valves 27,28 thereby causing maintenance of pressure in the brake line. The inlet valve opens either when acceleration drops below this lower limit, or when the higher, normal acceleration limit is reached, on the condition that the lag limit for the wheel is not reached. The comparator 12A, which after actuation acts as a bistable flipflop, is reset by a signal from either stage 11 or 17 on resetting to a pressure reduction cycle.

The necessary pressure increase in the braking circuit is calculated in the pressure comparator 13 by an acceleration signal from the acceleration calculating stage 9 being peak value followed in the peak value follower stage 14 and compared with a signal which represents the integrated value of control pulses for regulating the inlet valve 27 for the brake line of the appropriate wheel. These control pulses are fed from output 29A of stage 29 to input 16A of an integrating stage 16 in which the pulses are integrated, the output signals from stage 16 representing the pressure increase during a pressure increase cycle. The peak value follower stage 14 contains a voltage storing capacitor C14 and a blocking diode D14 which only enables signal passage when the instantaneous wheel acceleration signal exceeds the voltage already developed across the capacitor. Both the peak value follower stage 14 and the integrating stage 16 are arranged to be set to zero position (i.e. discharge) via their respective inputs 14B and 16C, respectively coupled to outputs 29B and 31C by control pulses to the outlet valve 28 for the brake line of the appropriate vehicle wheel.

The signal value stored in the capacitor C14 of peak value follower stage 14 represents the value to which the integrated value of the input pulses should rise for the braking capacity of the wheel against the road surface to be optimally utilized. This relationship between stored signal value and braking capacity is of fundamental importance in the principle of control according to the present invention and is therefore further clarified in the following functional description.

Apart from the above described braking pressure regulating stages 11,12,13,17 and 18, the calculating module 3 also comprises a time comparator 19 which, similar to the pressure comparator 13, is arranged to actuate the inlet valve 27 for increasing the braking pressure, while on the other hand stages 11,17 and 18 are arranged to actuate the outlet valve 28 for lowering the braking pressure. The inputs of the time comparator 19 are connected to a voltage divider and an RC-link with a high time constant. The capacitor in the RC-link is set to zero by pressure lowering pulses coupled to input 19B from output 29B and the comparator senses a definite time which has passed from the latest pressure reduction. When this interval of time has elapsed, the comparator causes increased pressure increase frequency in the pulse generator 21. The comparator 19 is connected with a gate incorporated in the central module 4, which gate receives output signals from the comparators 19 for all vehicle wheels. Only on the condition that output signals are coming in from all comparators 19 does this gate give an output signal for resetting the braking control system to its starting condition.

Stages 11,13,17,18 and 19 can operate either individually or in combination to provide output signals for altering braking pressure. Such an output signal is supplied to the pulse generator 21, which is also supplied with output signals from the acceleration detector 12 via a starting position stage 15 in connection with a wheel acceleration cycle. The pulse generator 21 is incorporated in the valve regulating module 2 and generates variable frequency valve signals. For this purpose the pulse generator contains a comparator having positive feedback for obtaining hysteresis, so that the comparator obtains two different reference levels. A capacitor 23 is connected to the negative input of the comparator, the capacitor being charged by control pulses to the valves 27,28 and being discharged by the pressure regulating stages 11, 13,17 and 19. During the charging phase, discharge of the capacitor 23 is blocked by a diode, and the voltage is thus increased to the upper reference level of the comparator, at which the comparator changes sign, breaking off the control pulse and thereby also charging of the capacitor 23.

The capacitor is discharged through a fixed resistance 24 in the pulse generator 21 and through the pressure regulating stages 11,13,17 and 19, discharging continuing until the lower reference level of the comparator is arrived at, when the comparator once again changes sign and charging starts in the manner described above. For discharge, the time between pulses is determined by the capacitor 23 in alternative coaction with the fixed resistance 24 and the resistances on the output side of the different pressure regulating stages 11,13,17,19 by the formation of RC-links with different time constants.

For pressure increase it is desirable under certain conditions to be able to provide high and low pulse frequencies, and for this purpose the pressure comparator 13 is arranged in such a way that the RC-links formed by the resistance on the output side of the pressure comparator and the capacitor 23 in the pulse generator 21, for an "O"-signal (low signal level) on the output of the comparator 13, give high pulse frequency, while for a "1"-signal (high signal level) the RC-link formed by the resistance 24 and the capacitor 23 gives considerably lower pulse frequency. With a pressure increase triggered by the time comparator 19, a pulse frequency which is lower than the normal frequency triggered by the pressure comparator is obtained for an O-signal while a 1-signal from the time comparator 19 does not actuate the pulse generator 21.

A pressure reduction signal to the pulse generator 21 triggered by the retardation comparator 17 and/or the lag detector 11 gives a pulse frequency which step by step reduces the pressure in the brake line.

Output signals from the detector stage 11 and the retardation comparator 17 are also supplied to the starting condition stage 15, which also receives output signals from the pressure comparator 13 and the retardation comparator 18. The starting condition stage 15 contains two separate circuits, of which one contains components for such control of the pulse generator 21 that this assumes starting position for sending a pulse gap on resetting from high to low pulse frequency, which under certain conditions is triggered by the pressure comparator 13. The retardation comparator 18 maintains starting position for a pulse gap in the pulse generator 21 during continuous pressure reduction. The other circuit in stage 15 is arranged to control the pulse generator in such a way that it assumes starting position for sending a pulse on switching to pressure reduction triggered by the detector stage 11 or the retardation comparator 17. If the lower acceleration limit is not arrived at during braking operation, the stage 11 or the comparator 17 also arranges for the pulse generator 21 to assume position for sending a pulse gap so that maximum time is obtained to the next pressure increase pulse.

According to the above, the pulse generator 21 is also supplied with a signal via the starting position circuit 15 from the acceleration detector 12 during the acceleration cycle, whereon an O-signal from the detector 12 causes a starting position for giving a valve pulse from the pulse generator 21, which means that the voltage across the capacitor 23 is kept at a constant level slightly below the lower resetting level of the detector. On a 1-signal from the detector 12, the valve pulse blocking ceases and the pulse generator 21 then generates the abovementioned pressure increase signals.

A valve regulating stage 29 for the inlet valve 27 is supplied with signals from the pulse generator 21, the acceleration detector 12 and the retardation comparator 17, or the lag detector stage 11, the signals being sensed by an AND-gate, the output signal of which is transferred via an OR-gate to a driving stage 32. The OR-gate also receives output signals from a maintenance circuit 25 comprised of an RS flip-flop which is set by 0-signals from the retardation comparator 17 or the lag detector 11 and from the gate in the central module 4. A 1-signal from the hold circuit 25 is generated by the gate when triggered by a normal braking function, which means that the inlet valve 27 is open.

The same signals fed to the regulating stage 29 are fed to a valve regulating stage 30 for the outlet valve 28, whereat signals from the retardation comparator 17 or the detector 11 are, however, inverted before feeding into an AND-gate. The output signals from this gate are inverted and supplied to a driving stage 31 for the outlet valve 28.

The control system according to the invention is automatically activated during a braking operation, when either the retardation or the slip of a braked wheel $d$ exceeds predetermined reference values. The control principle applied to the control system is based on braking pressure and thereby braking moment being varied during a braking operation, so that the braking capacity of the wheel on the road surface is utilized to a maximum, i.e., so that the maximum road moment (the product of wheel-road surface frictional force and wheel radius) is exceeded during braking, whereafter the braking pressure is reduced and a new pressure increase is begun when the speed of wheel $d$ is once again increased. In FIG. 3 both the braking moment M and the road moment B have been plotted diagrammatically as a function of the wheel slip $\lambda$ during a control procedure according to the invention. From the FIGURE it may be seen that the braking moment M is varied so that the road moment B passes through its maximum value during each control cycle. At the beginning of the control cycle, the braking moment M is increased according to the graph section $M_I$ while slip increases, i.e., the rotation speed of the wheel diminishes. The road moment B simultaneously increases and passes its maximum $B_m$. Thereafter the braking moment M is reduced according to the graph section $M_{II}$ while slip $\lambda$ continues to increase, at least to begin with, simultaneously as the road moment B continues to decrease. Reduction of the braking moment M is discontinued at the level $M_o$, which falls below the value of the road moment $B_m$ during the control cycle. By keeping M constant at the level $M_o$, the wheel speed is increased, i.e., slip is decreased, simultaneously as the road moment once again increases and passes its maximum $B_m$. Thereafter a new braking moment increase takes place at the beginning of the subsequent control cycle.

A closer study of the forces in action on a wheel during a braking operation can be made with the help of a moment equation about the centre of the wheel.

This moment equation may be written in the following manner:

$$B - M = \frac{I}{R} \times \frac{dv}{dt}; \tag{1}$$

where $$B = f_R N R \tag{2}$$

$$M = k P \tag{3}$$

$B$ = the road moment created by frictional force against road surface $M$ = the braking moment from wheel brakes $I$ = moment of inertia of the wheel $R$ = wheel radius $v$ = peripheral speed of the wheel $f_R$ = coefficient of friction, road surface-tire $N$ = normal force, road surface-tire $k$ = proportionality constant relating pressure P in braking medium to braking moment M[Equation (3)]

It can be seen from FIG. 3 and equation (1) that during the increase of wheel rotational speed, the wheel acceleration reaches its greatest value when the difference between B and M is greatest, i.e. when B has the value $B_m$ and M has the value $M_o$. This may be written:

$$B_m - M_o = \frac{I}{R} \times \left(\frac{dv}{dt}\right)_{max} \tag{4}$$

or $$B_m - M_o = \Delta B_m = \frac{I}{R} \times \left(\frac{dv}{dt}\right)_{max} \tag{5}$$

In the illustration of an actual pressure control cycle the graph portions $M_I$ and $M_{II}$ cling closely above the road moment graph B. The following approximation is therefore usable in this connection:

$$\Delta B_m = B_m - M_o = M_m - M_o = \Delta M_m \tag{6}$$

Equation (4) may therefore be written:

$$\Delta M_m = \frac{I}{R} \times \left(\frac{dv}{dt}\right)_{max} \tag{7}$$

The braking medium pressure increase $\Delta P$ required for accomplishing this braking moment increase will thus be:

$$\Delta P_m = \frac{I}{R \times k} \times \left(\frac{dv}{dt}\right)_{max} \tag{8}$$

Thus, by measuring the maximum wheel acceleration during spin-up of the wheel (i.e. the increase in speed of the wheel) it may be determined how great the unutilized road holding value $\Delta B_m$ is.

Hereby is obtained in advance, before the braking medium pressure, and thereby also the braking moment M, is again increased, a measure of how great the braking moment increase $\Delta M_m$ or the braking pressure medium increase $\Delta P_m$ is, which can be allowed with safety for the road friction available at the moment, without the occurrence of skidding.

To compensate for braking hysteresis, an empirical relationship (proportionality) between the braking medium pressure and the wheel speed alteration is simply utilized. Hysteresis is furthermore proportional to the braking medium pressure. The pressure alteration $\Delta P_h$ necessary for compensating hysteresis may be given thus:

$$\Delta P_h = m \times \left(\frac{dv}{dt}\right)_{max} \qquad (9)$$

where $m =$ a proportionality constant relating speed alteration to pressure alteration.

The required total braking medium pressure increase can thus be stated as:

$$\Delta P_{tot} = \Delta P_M + \Delta P_h = \left(\frac{1}{Rk} + m\right)\left(\frac{dv}{dt}\right)_{max} \qquad (10)$$

For achieving a definite pressure increase in the line leading to a wheel an inlet valve is incorporated in a valve unit 6. The inlet valve has two states, either open with a free passage to the brake cylinder or closed with a completely restricted supply. Since the pressure increases approximately linearly with time during a pressure increase cycle for the greater part of the pressure interval, the inlet valve can be opened for a time proportional to the maximum value of the wheel acceleration, thereby obtaining the desired pressure increase. It is advantageous here to use valves which give good linearity in the pressure increase graph, independent of pressure level and pedal force.

Even before the pressure increase is initiated, information is obtained on the pressure increase calculated on the basis of the appropriate wheel load and the nature of the road surface, which makes it possible to increase the pressure quickly in one stage to a level where effective braking is obtained. The result is better utilization of road friction, and a reduction in the braking distance. A subsequent minor slow pressure increase compensates for minor friction alterations and compensates for the road moment alteration caused by the vehicle weight shift forward during braking. At a sudden larger alteration in friction a corresponding pressure alteration step is obtained immediately.

Because the valves in the valve units 6 need not be opened so often, their regulating frequency thus being diminished, lower air consumption is obtained. In most cases the pressure control will furthermore be completely independent of the wheel slip and be responsive only to acceleration and retardation of the wheel. This is advantageous, since the calculated slip limit may deviate from the value at maximum friction, although pressure reduction can alternatively take place when a definite slip or retardation limit is exceeded.

In that case the retardation comparator 17 and the slip detector 11 trigger stepwise pressure reduction through intermittent opening of the outlet valve 28. However, retardation usually increases so heavily during a braking operation that the second retardation comparator 18 is actuated, whereat pressure reduction is continuous while the outlet valve 28 is kept open. This pressure reduction is discontinued when the reference value falls below the reference level in comparator 18, whereafter pressure reduction can continue stepwise until the inputs to the retardation comparator 17 and the slip detector 11 drop below the reference levels applied to these comparators. Pressure reduction can also be discontinued by the acceleration comparator 12 reaching a first acceleration limit and thereafter sending a signal which blocks both valves 27, 28 and maintains the pressure in the brake line constant.

The pressure increase is triggered in one case, when measured acceleration drops below the lower acceleration limit, on condition that the upper normal acceleration limit has not been reached and that the wheel slip falls below a decided reference level. In another case, which is the most usual, the upper normal acceleration limit is also reached during a braking operation and then pressure increase is triggered, on the condition that slip is below its reference level.

The pressure increase by means of inlet valve 27 takes place with high pulse frequency to a level which is determined by the voltage stored in the capacitor in the peak value follower stage, corresponding to the maximum acceleration of the wheel. According to the above, a signal corresponding to the pressure increase is generated during a control cycle in the integrator stage 16, this signal being compared with the capacitor voltage at the input of the pressure comparator 13, which, in response to the comparison result, alternates between rapid and slow pressure increase. If pressure increase takes place during a longer time than the time determined by the time comparator 19 since the previous pressure reduction, the comparator changes sign and triggers quicker pressure increase, which is discontinued only when pressure reduction is once again triggered.

An example of the relationship between braking medium pressure and individual wheel speed $v$ and speed alteration $dv/dt$ during braking is more closely shown by graphs $(a) - (c)$ of FIG. 4. During braking, the wheel is retarded and its speed is gradually reduced until, at $v_A$ in FIG. 4 graph $(a)$, the permitted retardation $r_I$ is exceeded. The retardation comparator 17 then gives a signal for pressure reduction. The retardation comparator 18 simultaneously senses that retardation increases heavily, and therefore triggers a continuous pressure reduction. As a result of valve lag etc., this pressure reduction is delayed by the time interval $\Delta t_I$. At $v_B$ retardation stops increasing, and therefore a signal is now given for closing the outlet valve. Closing takes place after a delay $\Delta t_2$, whereafter the pressure is kept constant awaiting continued pulsed pressure reduction. As a result of the reduction in braking moment due to lowering of pressure, the wheel begins to accelerate and exceeds, at $v_C$, the lower acceleration limit $a_I$, whereat pressure is kept constant and the circuitry prepares for a pressure increase. The upper acceleration limit $a_{II}$ is exceeded at $v_D$, and, as soon as this limit is passed, pressure increase will be initiated, since the wheel slip has been reduced to the value $\lambda_{ref}$. The wheel acceleration continues to increase and reaches at $v_E$ its greatest value during the increase of wheel rotational speed. The magnitude of the acceleration achieved at this point determines how great the coming pressure increase needs to be. When the slip value drops below $\lambda_{ref}$ at point $v_F$, pressure increase is initiated, and begins after a delay $\Delta t_3$. The pressure is thereafter increased in rapid steps to a level determined by the value of the acceleration in point $v_E$. Said level is attained at $v_G$, whereafter a slow further pressure increase takes place for compensating i.a. the forward weight shift of the vehicle. The permitted retardation value $r_I$ is exceeded at $v_H$, whereat the heavily increasing retardation triggers continous pressure reduction with a delay $\Delta t_4$ in the same way as at $v_A$. The retardation increase ceases at $v_I$, whereat the outlet valve is closed after a delay $\Delta t_5$, and the pressure is thereafter kept constant to allow the wheel to increase its speed once again. The lower acceleration limit $a_I$ is exceeded at $v_J$, whereat a pressure increase is prepared for (cf. at $v_C$). This time the upper acceleration limit $a_{II}$ is not exceeded, but the maximum acceleration is attained at $v_K$. When acceleration thereafter drops below the lower acceleration limit $a_I$, pressure increase is triggered, and is begun after the delay $\Delta t_6$. The pressure is thereafter quickly increased by a value corresponding to the maximum acceleration measured at $v_K$, although the pressure increase never takes place with less than a certain minimum value.

In the case illustrated here, pressure increase between $v_F$ and $v_G$ takes place by the pressure being pulsed with constant steps. It is however also possible to increase the pressure in one single step. It is just as possible to replace the slow pressure increase between $v_G$ and $v_H$ with a continuous pressure raise, whereat the valve is allowed to have a certain leakage.

What I claim is:

1. A method for regulating braking operations in a vehicle equipped with a braking control system including means for measuring wheel rotational speed, an electronic unit and a valve unit situated in a brake pressure line for at least one of the wheels, said braking control system, during a braking operation, causing the braking pressure applied to the wheel through the brake pressure line to vary in response to reference values for different observed control parameters so that the wheel, during the course of the braking operation, is affected during a number of braking control cycles, during which the wheel, by means of braking pressure alterations, is retarded from a first rotational speed to a second lower rotational speed, during which retardation the maximum braking capacity of the wheel on the appropriate road surface is surpassed, thereafter reducing the braking pressure to the wheel enabling the wheel to accelerate and increase its rotational speed at the reduced braking pressure whereby at least one of the observed reference parameters will trigger the next controlling cycle;

measuring during said acceleration the wheel rotational acceleration;

creating a first signal level representing maximum wheel rotational acceleration and temporarily storing the first signal level which serves to provide an indication of the amount of braking pressure increase that is possible over the braking pressure present during the time that the wheel is permitted to accelerate thereby making it possible to obtain optimum braking capacity between the wheel and the road surface;

initiating an increase in braking pressure and developing a second signal level representing the actual amount of brake pressure increase;

comparing the temporary stored signal with the second signal;

continually increasing the brake pressure until the first and second signal levels are equal.

2. A method according to claim 1, characterized in that slip and retardation parameters are observed during braking from the first to the second rotational speed, and a pressure reduction is initiated when either slip or retardation exceeds associated predetermined reference values, and that the pressure reduction is discontinued when the retardation ceases to increase.

3. A method according to claim 1, characterized in that wheel acceleration is observed during the wheel acceleration, the observed acceleration is compared against a first lower and a second higher predetermined acceleration limit, and braking pressure is held constant when the observed acceleration lies between said limits.

4. A method according to claim 3, characterized in that when both the first and the second predetermined acceleration limits are exceeded before the maximum acceleration is attained a pressure increase is triggered when wheel slip falls below a predetermined threshold.

5. A method according to claim 3, characterized in that when both the acceleration limits of the wheel are exceeded and the actual slip of the wheel is at that time greater than the predetermined slip reference value, the braking pressure is held constant between the lower acceleration limit and the slip reference value, a braking pressure increase as determined by the maximum acceleration being then initiated when the slip value falls below the predetermined slip reference value.

6. A method according to claim 3, characterized in that when the value of the wheel acceleration does not reach the first acceleration limit before the actual wheel falls below the predetermined slip reference value, a pulsed pressure increase is initiated.

7. A method according to claim 1, characterized in that if, during the wheel acceleration, only the lower predetermined acceleration is attained, a pressure increase of a value determined by the maximum value of the acceleration is initiated when the wheel acceleration falls below the lower acceleration limit.

8. A method according to claim 1, characterized in that brake pressure increase is discontinued only when pressure reduction is initiated anew.

9. A method according to claim 1, characterized in that the reduction in brake pressure is performed in a continuous manner.

10. A method according to claim 1, characterized in that the reduction in brake pressure is performed in a stepwise manner.

11. A method according to claim 1, characterized in that the increase in brake pressure is performed in a stepwise manner.

12. A method according to claim 1, characterized in that the brake pressure is increased in a continuous manner.

13. A method according to claim 1, characterized by observing the vehicle speed and deactivating the controlling means which controls the course of events during a braking cycle, when the vehicle speed falls below a predetermined value.

14. Control means for regulating a braking operation for the braking means of at least one wheel in a vehicle having a brake line for coupling the braking pressure medium to the wheel braking means, said control system comprising:

measuring means sensing the wheel speed for generating a first signal representative of wheel speed;

a valve unit positioned within said brake line for selectively coupling the braking pressure medium to the wheel braking means;

an electronic unit for controlling the braking operation, said electronic unit including means for regulating the valve unit in response to signals from said measuring means to adjustably increase, decrease or maintain constant the pressure in the brake line to said braking means, whereby the wheel is sequentially caused to retard and to accelerate so that the maximum wheel braking capacity on the appropriate road surface is obtained, characterized in that the electronic unit further comprises peak value follower circuit means coupled to said measuring means for determining the maximum wheel acceleration during a control cycle in which braking pressure is reduced;

monitoring means responsive to operating signals applied to said valve unit by said valve regulating means for generating a signal representative of the pressure change applied to the braking means;

a pressure comparator for comparing the output of said peak value follower circuit with the output of the monitoring means for generating a control signal for application to the valve unit to regulate pressure in the brake line to bring the signal value representing brake pressure into equality with the signal representing peak acceleration, whereby said comparator terminates any further pressure increase.

15. The braking control means of claim 14, wherein said monitoring means includes integrating circuit means for integrating the input signals applied thereto as the braking pressure applied to the wheel braking means is altered.

16. The control means of claim 15, further comprising first and second means coupled between said monitoring means and said integrating circuit means for respectively increasing or reducing the output of the integrating circuit means as braking pressure applied to the wheel braking means is respectively increased or reduced.

17. The control means of claim 14, wherein said electronic unit further incorporates a valve regulating module for controlling the valve unit;

said measuring means and the means for detecting pressure changes being connected in series between the measuring means and the valve regulating module;

a central module being coupled to at least one of said measuring means for calculating the vehicle speed responsive to said first signal to provide reference values for the control parameters being observed.

18. The control means of claim 17, further comprising slip detector means for comparing the wheel speed from said measuring means with a predetermined reference level for controlling the valve regulating module to trigger pressure reduction when the reference value is exceeded.

19. The control means of claim 18, further comprising acceleration detection means responsive to said first signal for comparing the wheel acceleration against first and second predetermined acceleration reference levels;

said acceleration detector means being adapted to actuate the valve regulating module when at least one of said limits are exceeded;

said valve regulating module further including logical gating means for triggering a pressure increase only when both predetermined acceleration limits have been exceeded and when the slip detector provides a signal which indicates that the value for slip has not reached the reference value.

20. The control means of claim 18, wherein said pressure detection means further comprises acceleration detector means for actuating the valve regulating module when wheel acceleration is greater than a predetermined lower wheel acceleration threshold level and less than the higher wheel acceleration threshold level and when the output of said slip detector is such that the value for slip falls below the predetermined slip reference value.

21. The control means of claim 17, further comprising second comparator means responsive to said measuring means first signal and a predetermined reference level representative of wheel retardation for operating the valve regulating unit to trigger a pressure reduction when the retardation reference level is exceeded.

22. The control means of claim 21, wherein said second comparator means further comprises means coupled between said measuring means and said second comparator means generating a signal representative of the time derivative of said first signal.

23. The control means of claim 15, further comprising means coupled between said measuring means and said peak value follower circuit for generating a signal representative of the time derivative of said first signal.

24. The control means of claim 14, further comprising pulse generator means coupled between said valve regulating means and said pressure comparator means for controlling the valve regulator means in a stepwise manner.

25. Control means for braking at least one wheel of a wheeled vehicle in accordance with a control cycle wherein wheel rotation is retarded, for relieving braking pressure by a predetermined amount to permit acceleration of the wheel and for observing control parameters for controlling the next and subsequent braking cycles, said control means comprising:

means for measuring the speed of said wheel;

means coupled to said measuring means for generating a signal representative of the peak acceleration obtained by the wheel during the braking cycle in which braking pressure is relaxed;

means responsive to braking pressure for generating a signal representative of the value of braking pressure at any given instant;

means for comparing the aforesaid peak acceleration value against the present braking pressure value for generating a signal representative of the need for increased braking pressure;

braking means for braking said wheel and means coupled between said comparator means and said braking means for increasing the braking pressure applied to said braking means; and means responsive to the increased pressure applied to said braking means for altering the pressure level applied to said comparator means whereby said comparator means terminates further increases in braking pressure when the signal developed by the means responsive to increased braking pressure equals the signal representing the peak acceleration value of the wheel, whereby the increase in braking pressure is limited by maximum wheel acceleration.

26. The control means of claim 25, further comprising means coupled to said measuring means for determining vehicle speed;

wheel slip comparator means for comparing wheel speed with vehicle speed to generate a signal representing the slip value for operating the valve regulating means to increase the braking pressure applied to the braking means when the slip value falls below the reference value;

additional comparator means coupled to the measuring means for comparing the retardation of wheel speed against a predetermined threshold level for increasing braking pressure when the wheel retardation is below the threshold level.

\* \* \* \* \*